(12) United States Patent
Tandon et al.

(10) Patent No.: US 11,163,600 B2
(45) Date of Patent: Nov. 2, 2021

(54) PROVIDING PHYSICAL HOST STATE INFORMATION TO VIRTUAL MACHINES DEPLOYED ON THE PHYSICAL HOST

(71) Applicant: Juniper Networks, Inc., Sunnyvale, CA (US)

(72) Inventors: Abhinav Tandon, Bangalore (IN); Kaustubh Shantanu, Bangalore (IN); Siva Krishna Gudivada, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 191 days.

(21) Appl. No.: 16/554,054

(22) Filed: Aug. 28, 2019

(65) Prior Publication Data

US 2021/0064404 A1 Mar. 4, 2021

(51) Int. Cl.
*G06F 9/455* (2018.01)

(52) U.S. Cl.
CPC .. *G06F 9/45558* (2013.01); *G06F 2009/4557* (2013.01); *G06F 2009/45579* (2013.01); *G06F 2009/45595* (2013.01)

(58) Field of Classification Search
CPC ....... G06F 9/45558; G06F 2009/45579; G06F 2009/4557; G06F 2009/45595
See application file for complete search history.

(56) References Cited

U.S. PATENT DOCUMENTS

| 8,269,762 | B2 | 9/2012 | Beckman et al. | |
| 8,830,870 | B2 | 9/2014 | Cardona et al. | |
| 2009/0276772 | A1* | 11/2009 | Garrett | G06F 9/455 718/1 |
| 2009/0288084 | A1* | 11/2009 | Astete | G06Q 30/0601 718/1 |
| 2010/0094981 | A1* | 4/2010 | Cordray | H04L 41/082 709/222 |
| 2015/0347167 | A1* | 12/2015 | Bonazzola | G06F 9/45558 718/1 |
| 2017/0123839 | A1 | 5/2017 | Bugenhagen | |

\* cited by examiner

*Primary Examiner* — Dong U Kim
(74) *Attorney, Agent, or Firm* — Harrity & Harrity, LLP

(57) ABSTRACT

An orchestrator component, of a host device, may establish a connection to a bridge associated with the host device, where multiple virtual machines are executing on the host device. The orchestrator component may provide, to one or more of the multiple virtual machines, a notification about the bridge associated with the host device, where the notification is to permit the one or more of the multiple virtual machines to connect to the bridge. The orchestrator component may obtain one or more dynamic parameters relating to the host device, and may provide the one or more dynamic parameters for transmission to the one or more of the multiple virtual machines via the bridge to permit the one or more of the multiple virtual machines to receive and process the one or more dynamic parameters.

20 Claims, 14 Drawing Sheets

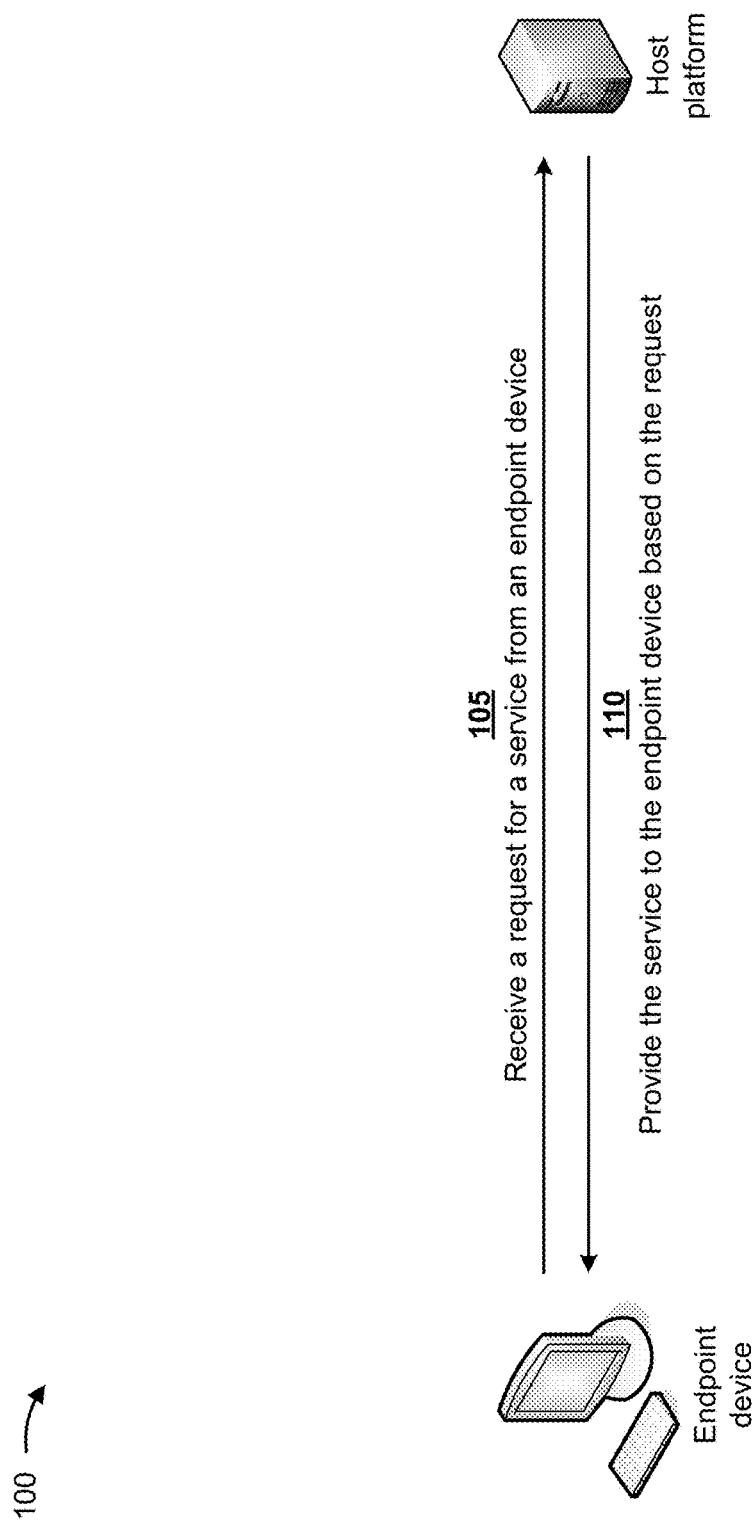

PROVIDING PHYSICAL HOST STATE INFORMATION TO VIRTUAL MACHINES DEPLOYED ON THE PHYSICAL HOST

BACKGROUND

A customer may utilize one or more virtual machines deployed within a cloud computing environment to access one or more services, such as computation, software, data access, storage, and/or the like, services.

SUMMARY

According to some implementations, a method may include establishing, by an orchestrator component, a connection to a bridge associated with a host device, wherein the orchestrator component and a plurality of virtual machines are executing on the host device. The method may include providing, by the orchestrator component and to one or more of the plurality of virtual machines, a notification about the bridge associated with the host device, wherein the notification is to permit the one or more of the plurality of virtual machines to connect to the bridge. The method may include obtaining, by the orchestrator component, one or more dynamic parameters relating to the host device, and providing, by the orchestrator component, the one or more dynamic parameters for transmission to the one or more of the plurality of virtual machines via the bridge to permit the one or more of the plurality of virtual machines to receive and process the one or more dynamic parameters.

According to some implementations, a host device may include one or more memories, and one or more processors, communicatively coupled to the one or more memories, to implement a bridge, a plurality of virtual machines, and an orchestrator to establish a connection to the bridge. The orchestrator may provide, to the plurality of virtual machines, a notification about the bridge, wherein the notification is to permit the plurality of virtual machines to connect to the bridge, and may obtain one or more parameters relating to the host device. The orchestrator may provide the one or more parameters for transmission to the plurality of virtual machines via the bridge to permit the plurality of virtual machines to process and identify the one or more parameters.

According to some implementations, a non-transitory computer-readable medium may store one or more instructions that, when executed by one or more processors of a host device, may cause the one or more processors to implement a bridge, a virtual machine, and an orchestrator to establish a connection to the bridge. The orchestrator may provide, to the virtual machine, a notification about the bridge, wherein the notification is to permit the virtual machine to connect to the bridge, and may obtain one or more dynamic parameters relating to the host device. The orchestrator may provide the one or more dynamic parameters for transmission to the virtual machine via the bridge to permit the virtual machine to receive and process the one or more dynamic parameters.

BRIEF DESCRIPTION OF THE DRAWINGS

FIGS. 1A-1I are diagrams of one or more example implementations described herein.

DETAILED DESCRIPTION

Figure 1B:
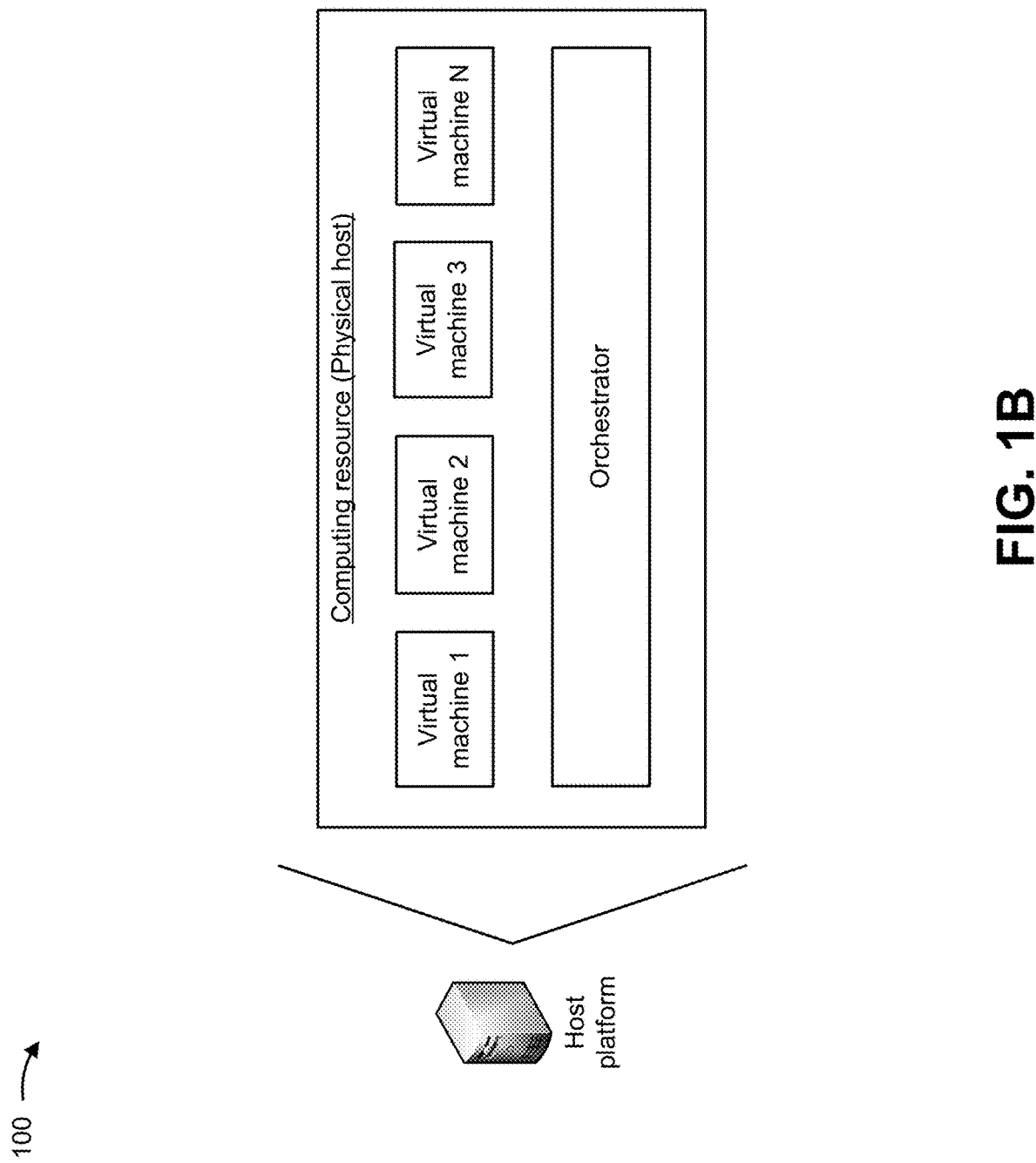

The following detailed description of example implementations refers to the accompanying drawings. The same reference numbers in different drawings may identify the same or similar elements.

A customer utilizing a cloud computing environment may need to know information about a physical host (e.g., a computing resource of the cloud computing environment) where a virtual machine, utilized by the customer, is deployed. Information about a physical host may include static information and dynamic information. The static information may include physical host information that remains unchanged during a lifetime of the virtual machine, such as information identifying a location of the physical host, a time zone associated with the physical host, a proprietary version or mode associated with the physical host, and/or the like. The dynamic information may include physical host information that may change during the lifetime of the virtual machine, such as information identifying a name of the physical host executing the virtual machine, a software package version associated with the physical host, a current load on the physical host, malfunctioning hardware on the physical host, and/or the like. Currently, however, a virtual machine is unable to obtain such dynamic information from the physical host. Furthermore, users who have access to a virtual machine may be different than an administrator of the host, but may have overlapping interests with the administrator. For example, the users may want to be aware of certain parameters of the host, such as a version of a particular software package installed on the host, a value of a certain configuration parameter on the host, and/or the like, but are unable to receive such parameters.

2. This method can be used for Identifying the host on which the VIVI is hosted.

Without such information, the virtual machine may be unaware of issues associated with the physical host until the virtual machine ceases performance or experiences degraded performance due to such issues (e.g., that cause traffic to be lost, cause traffic to be delayed, require re-routing of traffic, and/or the like). This, in turn, wastes computing resources (e.g., processing resources, memory resources, and/or the like), networking resources, and/or the like associated with identifying and/or correcting the issues associated with the physical host, identifying and/or correcting the traffic outage, re-routing traffic, locating lost traffic, and/or the like.

Some implementations described herein provide a host platform that provides physical host state information to virtual machines deployed on the physical host. For example, an orchestrator component of the host platform may establish a connection to a bridge associated with the host platform, wherein the orchestrator component and multiple virtual machines are executing on the host platform. The orchestrator component may provide, to one or more of the multiple virtual machines, a notification about the bridge associated with the host platform, wherein the notification is to permit the one or more of the multiple virtual machines to connect to the bridge. The orchestrator component may obtain one or more dynamic parameters relating to the host platform, and may provide the one or more dynamic parameters for transmission to the one or more of the multiple virtual machines via the bridge to permit the one or more of the multiple virtual machines to receive and process the one or more dynamic parameters.

In this way, a virtual machine may be aware of information and/or issues associated with a physical host providing the virtual machine, which reduces or prevents traffic outages for the virtual machine (e.g., that cause traffic to be lost, cause traffic to be delayed, require re-routing of traffic, and/or the like). This, in turn, conserves computing resources (e.g., processing resources, memory resources, and/or the like), networking resources, and/or the like that would otherwise be wasted in identifying and/or correcting the issues associated with the physical host, identifying and/or correcting the traffic outage, re-routing traffic, locating lost traffic, and/or the like.

FIGS. 1A-1I are diagrams of one or more example implementations 100 described herein. As shown in FIG. 1A, an endpoint device may be associated with a host platform. For example, the host platform may be a cloud computing environment that includes computing resources to provide cloud services to the endpoint device. As further shown in FIG. 1A, and by reference number 105, the host platform may receive a request for a service (e.g., a cloud service) from the endpoint device. The host platform may process the request and may utilize a computing resource (e.g., with one or more virtual machines) to provide the service. For example, based on the request for the service, the host platform may set up a virtual machine on a computing resource (e.g., a physical host). As further shown in FIG. 1A, and by reference number 110, the host platform may provide the service to the endpoint device based on the request.

As shown in FIG. 1B, the computing resource may include an orchestrator and one or more virtual machines, such as a first virtual machine (e.g., virtual machine 1), a second virtual machine (e.g., virtual machine 2), a third virtual machine (e.g., virtual machine 3), and an Nth virtual machine (e.g., virtual machine N) (where N≥1). The computing resource is shown with N virtual machines (e.g., virtual machine 1, virtual machine 2, virtual machine 3, and virtual machine N), but may include more or fewer virtual machines than depicted in FIG. 1B.

The orchestrator may include an application that provisions, deploys, and/or starts computing resources; acquires and/or assigns storage capacity for computing resources; manages networking for the host platform; creates virtual machines; acquires access to specific software on the host platform; integrates permission checks for security and compliance; and/or the like. A virtual machine may include a software implementation of a machine (e.g., a computer) that executes programs like a physical machine. In some implementations, the orchestrator may deploy one or more virtual machines to provide the service to the endpoint device shown in FIG. 1A.

Figure 1C:
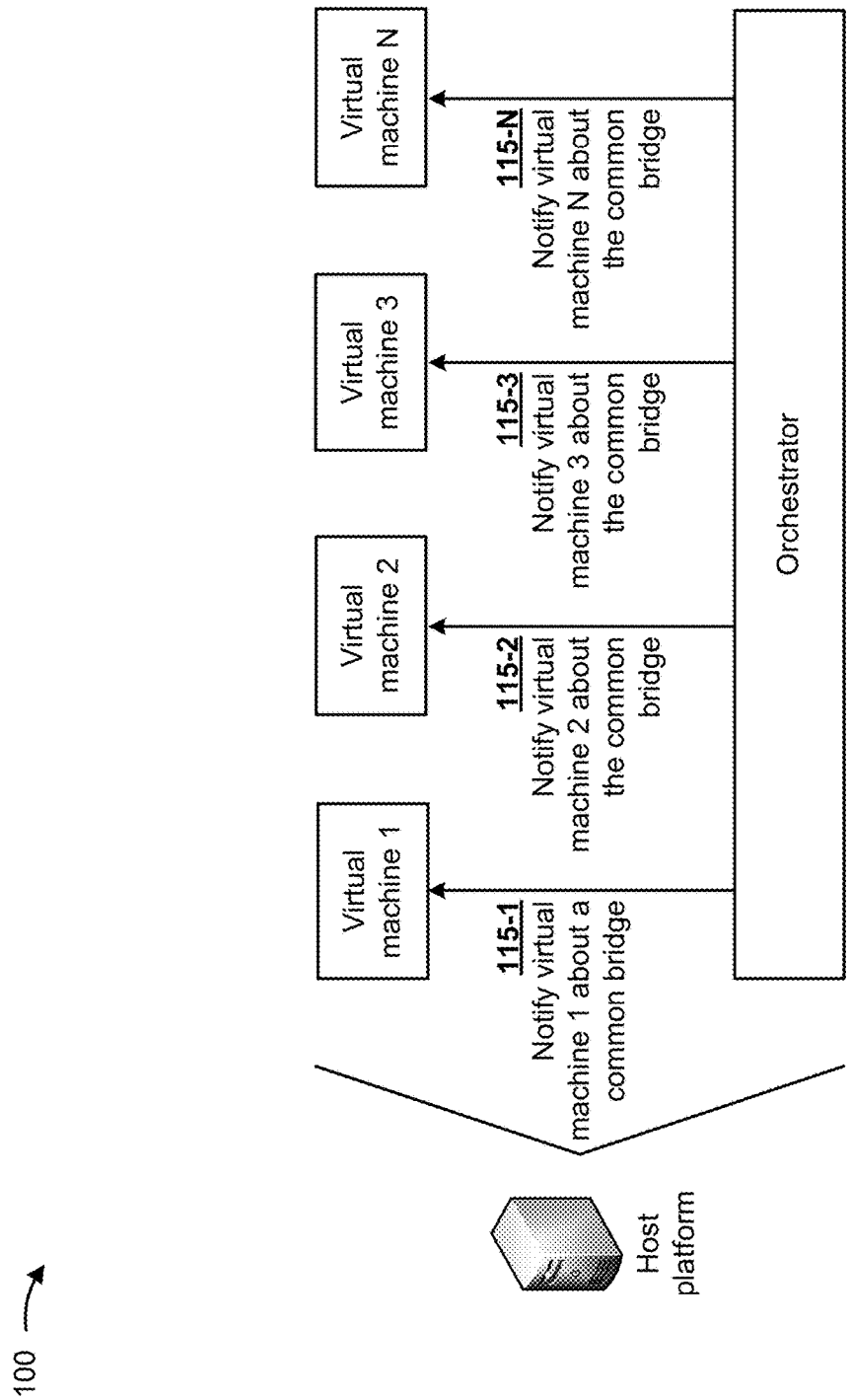

As shown in FIG. 1C, the orchestrator may provide, to the one or more virtual machines, notifications about a common bridge associated with the computing resource. In some implementations, the orchestrator may provide, to the one or more virtual machines, information indicating a location (e.g., an identifier) of the common bridge in a memory associated with the computing resource. For example, as shown by reference number 115-1, the orchestrator may notify (e.g., provide a notification to) a first virtual machine (e.g., virtual machine 1) about the location of the common bridge. As further shown in FIG. 1C, and by reference numbers 115-2, the orchestrator may notify (e.g., provide a notification to) a second virtual machine (e.g., virtual machine 2) about the location of the common bridge. As shown by reference number 115-3, the orchestrator may notify (e.g., provide a notification to) a third virtual machine (e.g., virtual machine 3) about the location of the common bridge. As shown by reference number 115-N, the orchestrator may notify (e.g., provide a notification to) an Nth virtual machine (e.g., virtual machine N) about the common bridge.

In some implementations, the orchestrator may provide the notifications about the common bridge via a system management basic input/output system (SMBIOS) string or a tag inserted in a domain extensible markup language (XML). The SMBIOS string or the tag may include information identifying the location of common bridge in the memory associated with the computing resource, types of information to be provided by the common bridge (e.g., dynamic host parameters, as described below), formats of the information to be provided by the common bridge, and/or the like.

Figure 1D:
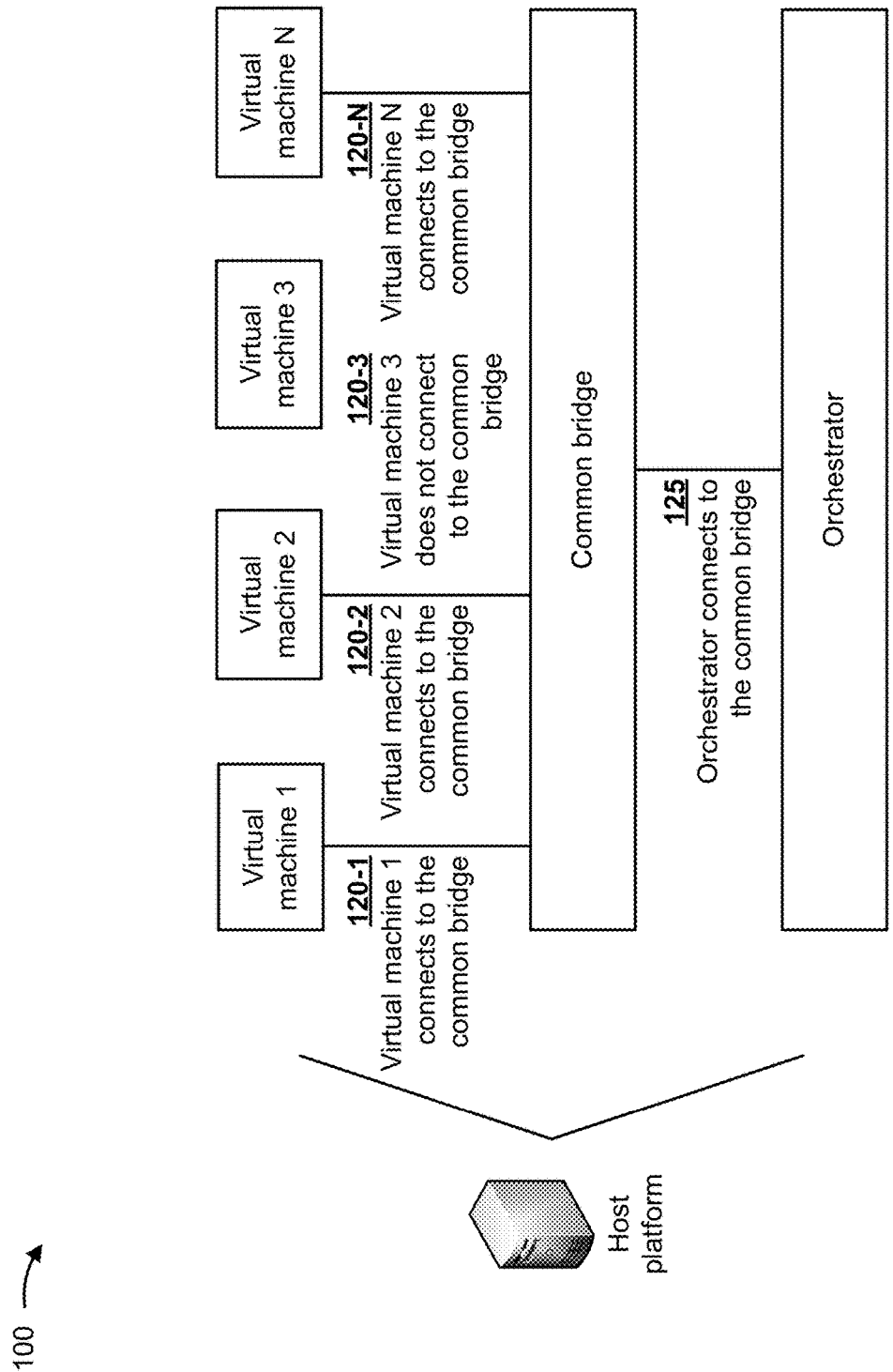

As shown in FIG. 1D, based on the notifications, the one or more virtual machines may connect to the common bridge by registering, with the common bridge, to receive information to be broadcast by the common bridge. In some implementations, the one or more virtual machines may elect whether to connect to the common bridge based on the notifications. For example, a virtual machine may connect to the common bridge if the virtual machine is interested in receiving the information to be provided by the common bridge (e.g., as identified in the notification), another virtual machine may not connect to the common bridge if the virtual is not interested in receiving the information to be provided by the common bridge, and/or the like.

As shown in FIG. 1D, and by reference number 120-1, the first virtual machine (e.g., virtual machine 1) may connect to the common bridge based on the notification (e.g., indicating that the first virtual machine is interested in receiving the information to be provided by the common bridge). As shown by reference number 120-2, the second virtual machine (e.g., virtual machine 2) may connect to the common bridge based on the notification (e.g., indicating that the second virtual machine is interested in receiving the information to be provided by the common bridge). As shown by reference number 120-3, the third virtual machine (e.g., virtual machine 3) may not connect to the common bridge (e.g., indicating that the third virtual machine is not interested in receiving the information to be provided by the common bridge). As shown by reference number 120-N, the Nth virtual machine (e.g., virtual machine N) may connect to the common bridge based on the notification (e.g., indicating that the Nth virtual machine is interested in receiving the information to be provided by the common bridge). As further shown in FIG. 1D, and by reference number 125, the orchestrator may connect to the common bridge. The orchestrator may connect to the common bridge to enable the orchestrator to provide information (e.g., host parameters) to the common bridge and to virtual machines connected to the common bridge, as described below.

Figure 1E:
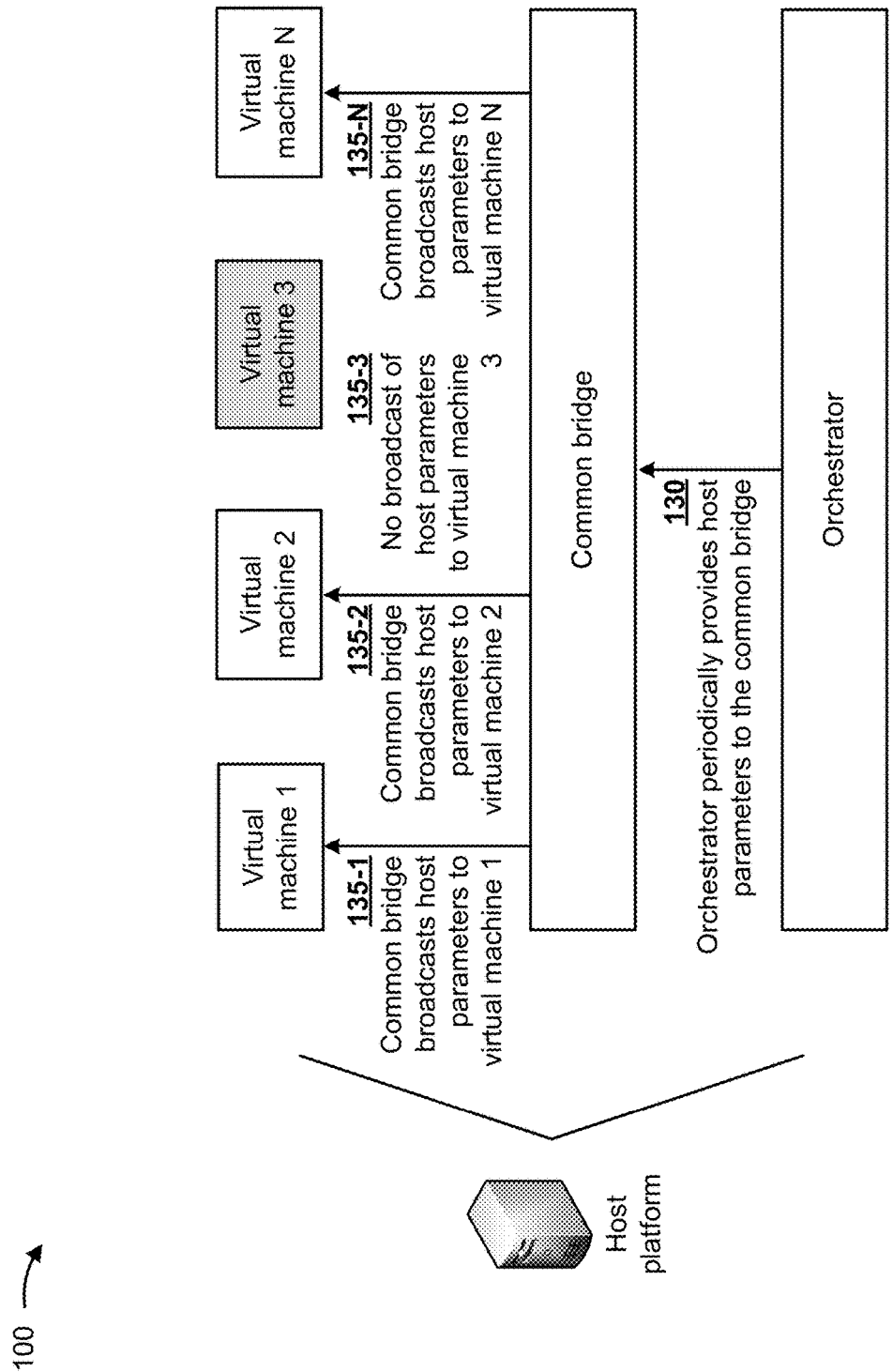

As shown in FIG. 1E, the orchestrator may periodically provide host parameters (e.g., associated with the computing resource) to the common bridge. In some implementations, and as shown by reference number 130, the orchestrator may obtain the host parameters from the computing resource, and may periodically provide the host parameters to the common bridge. One or more of the host parameters may be dynamic parameters that include information, associated with the computing resource, that periodically changes. In some implementations, the host parameters may include a hostname of the computing resource, a software version associated with the computing resource, a software version associated with the orchestrator of the host platform, and/or the like. In some implementations, one or more of the host parameters may be configured on the computing resource.

As further shown in FIG. 1E, and by reference number 135-1, the common bridge may broadcast the host parameters (e.g., provide a broadcast message that includes the host parameters) to the first virtual machine (e.g., virtual machine 1). As shown by reference number 135-2, the common bridge may broadcast the host parameters to the second virtual machine (e.g., virtual machine 2). As shown by reference number 135-3, the common bridge may not broadcast host parameters to the third virtual machine (e.g., virtual machine 3) since the third virtual machine did not connect to the common bridge. As shown by reference number 135-N, the common bridge may broadcast the host parameters to the Nth virtual machine (e.g., virtual machine N).

In some implementations, the orchestrator may provide the host parameters for transmission to one or more of the virtual machines, via the common bridge, to permit the one or more virtual machines to provide the host parameters to one or more endpoint devices associated with the one or more virtual machines. The orchestrator may, for example, provide the host parameters to the common bridge in an extensible markup language (XML) format or a JavaScript object notation (JSON) format. In some implementations, the orchestrator may provide the host parameters for transmission to the one or more virtual machines, via the common bridge, at predetermined intervals (e.g., in seconds, minutes, hours, and/or the like). In some implementations, the orchestrator may provide the host parameters for transmission to the one or more virtual machines, via the common bridge, based on an event (e.g., based on detecting a change to a host parameter).

Figure 1F:
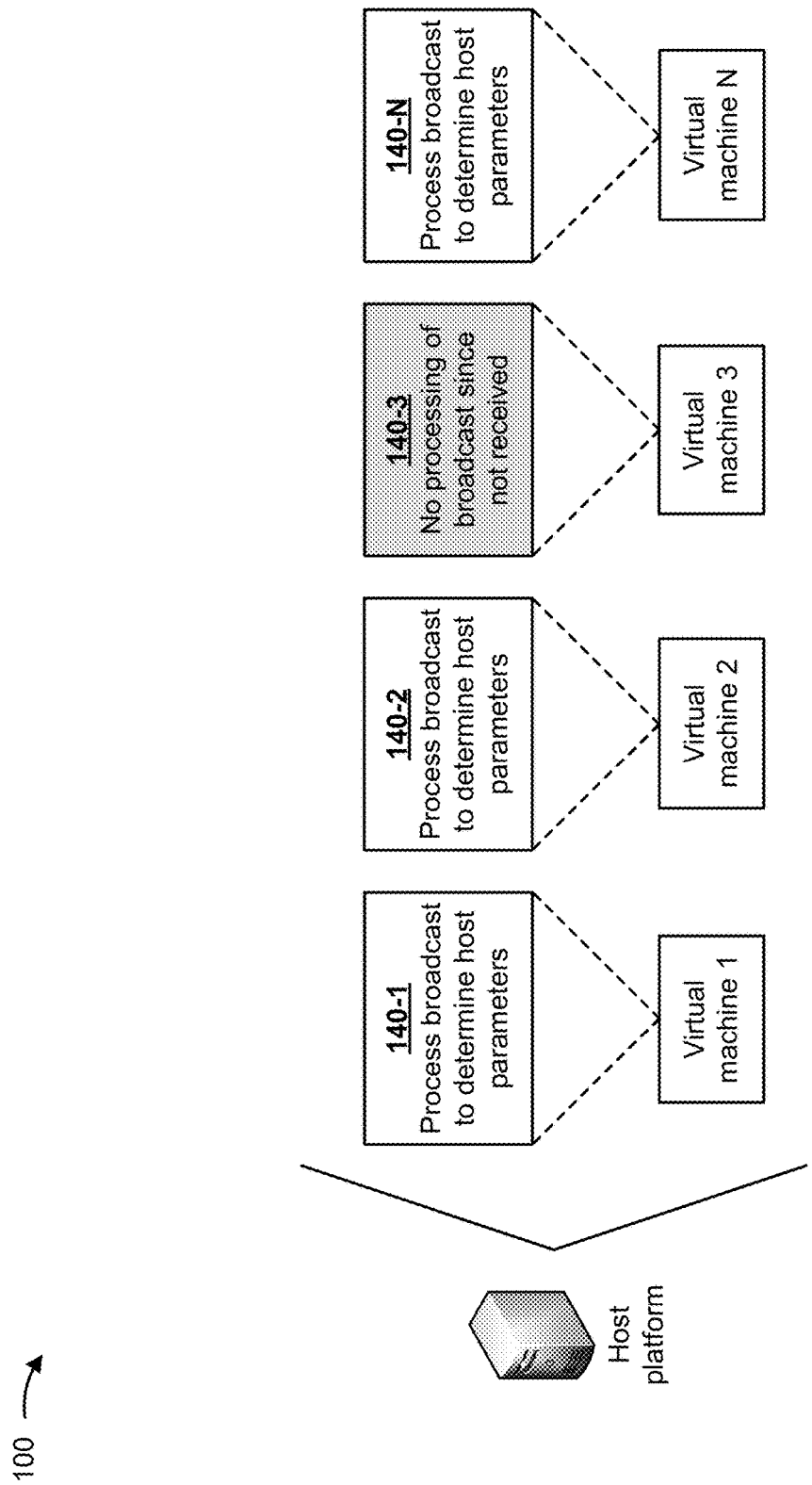

As shown in FIG. 1F, the one or more virtual machines may process the broadcast messages to identify the host parameters. In some implementations, the host platform may provide a client application to the one or more virtual machines. The client application may enable the one or more virtual machines to receive the broadcast messages, parse the broadcast messages, and identify the host parameters in the broadcast messages.

As further shown in FIG. 1F, and by reference number 140-1, the first virtual machine (e.g., virtual machine 1) may process the broadcast messages to determine the host parameters. As shown by reference number 140-2, the second virtual machine (e.g., virtual machine 2) may process the broadcast messages to determine the host parameters. As shown by reference number 140-3, the third virtual machine (e.g., virtual machine 3) may not process the broadcast messages since, as described above, no broadcast messages were received by the third virtual machine (e.g., virtual machine 3). As shown by reference number 140-N, the Nth virtual machine (e.g., virtual machine N) may process the broadcast messages to determine the host parameters.

Figure 1G:
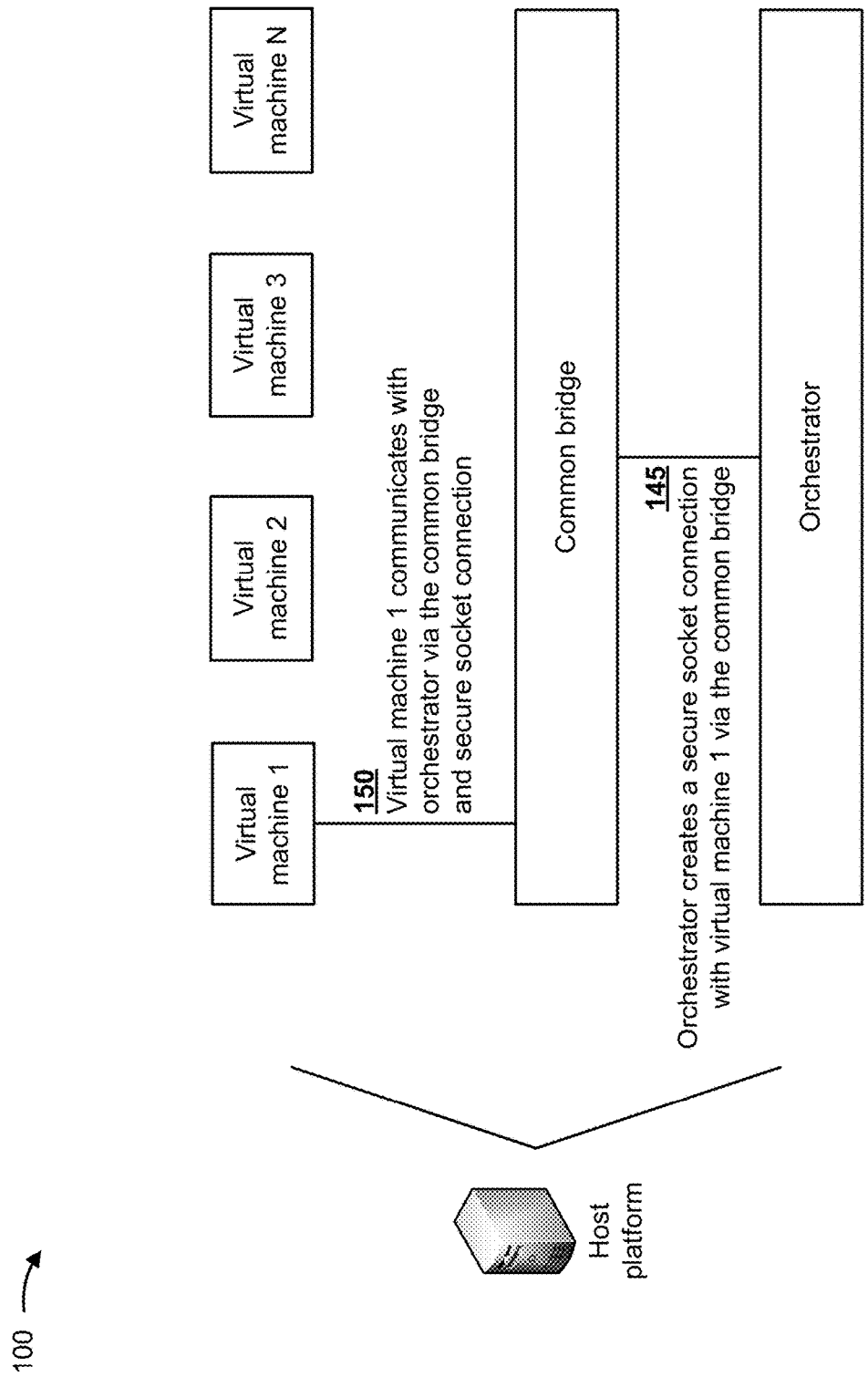

In some implementations, the host platform may create a secure connection (e.g., a secure socket connection) between the orchestrator and one of the virtual machines. Such secure connections may be established individually between the orchestrator and each of the virtual machines, via the common bridge, in order to provide a secure mechanism for transmitting the host parameters to each of the virtual machines. As shown in FIG. 1G, and by reference number 145, the orchestrator may create a secure socket connection with the first virtual machine (e.g., virtual machine 1) via the common bridge. As further shown in FIG. 1G, and by reference number 150, the first virtual machine (e.g., virtual machine 1) may communicate with the orchestrator via the common bridge and the secure socket connection. In this example, the orchestrator may not create secure socket connections with the second virtual machine (e.g., virtual machine 2), the third virtual machine (e.g., virtual machine 3), and the Nth virtual machine (e.g., virtual machine N).

Figure 1H:
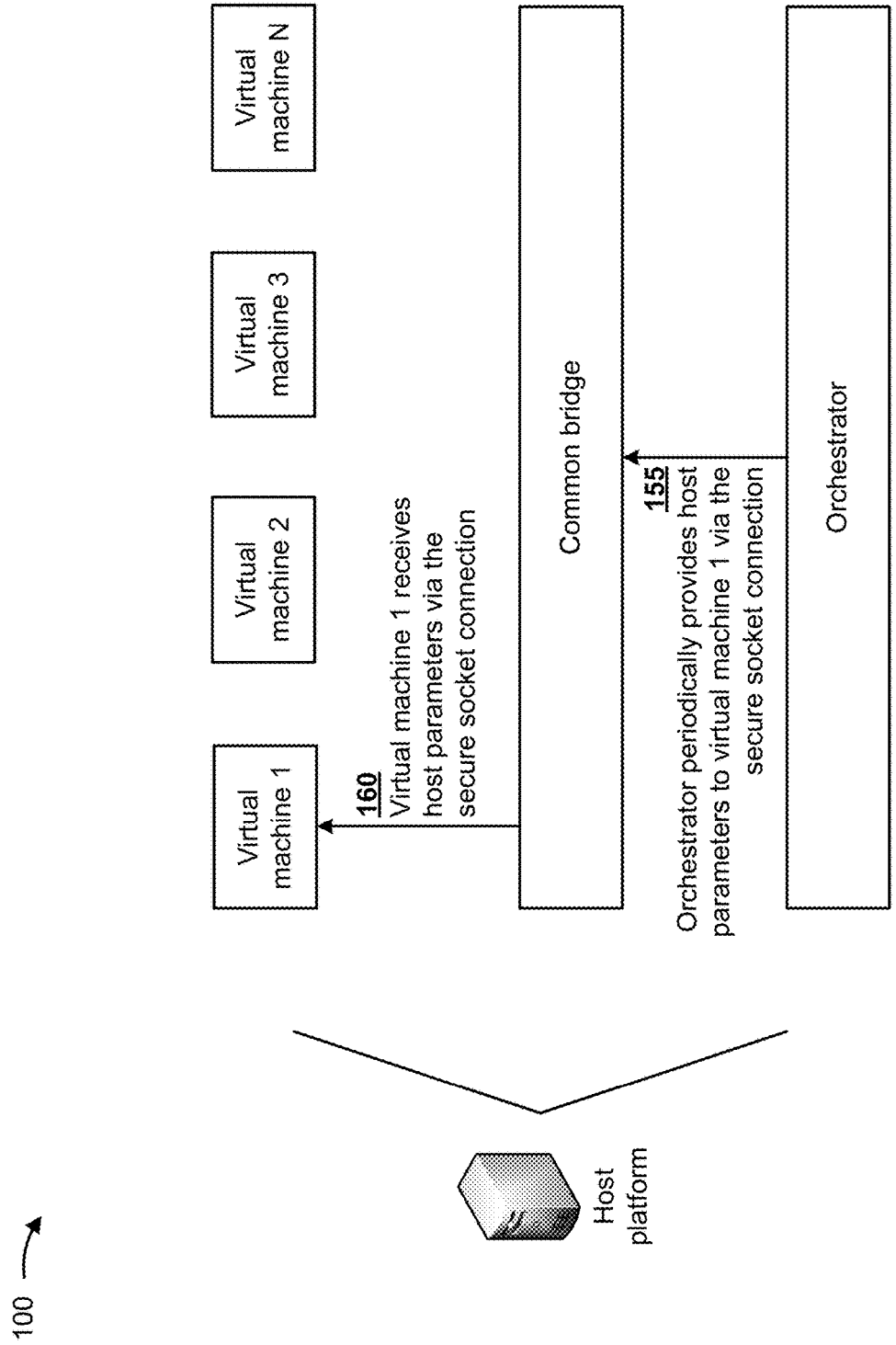

As shown in FIG. 1H, and by reference number 155, the orchestrator may periodically provide host parameters to the first virtual machine (e.g., virtual machine 1) via the secure socket connection created with the first virtual machine (e.g., virtual machine 1). In some implementations, the orchestrator may provide, to the first virtual machine, messages that include the host parameters via the secure socket connection (e.g., secure socket messages). As further shown in FIG. 1H, and by reference number 160, the first virtual machine (e.g., virtual machine 1) may receive the host parameters via the secure socket connection. In some implementations, the orchestrator may provide additional host parameters to the first virtual machine (e.g., virtual machine 1) via the secure socket connection, and the first virtual machine (e.g., virtual machine 1) may receive the additional host parameters. In some implementations, as described above, since secure socket connections were not created with the second virtual machine (e.g., virtual machine 2), the third virtual machine (e.g., virtual machine 3), and the Nth virtual machine (e.g., virtual machine N), the host parameters and/or the additional host parameters may not be received by the second virtual machine (e.g., virtual machine 2), the third virtual machine (e.g., virtual machine 3), and the Nth virtual machine (e.g., virtual machine N).

Figure 1I:
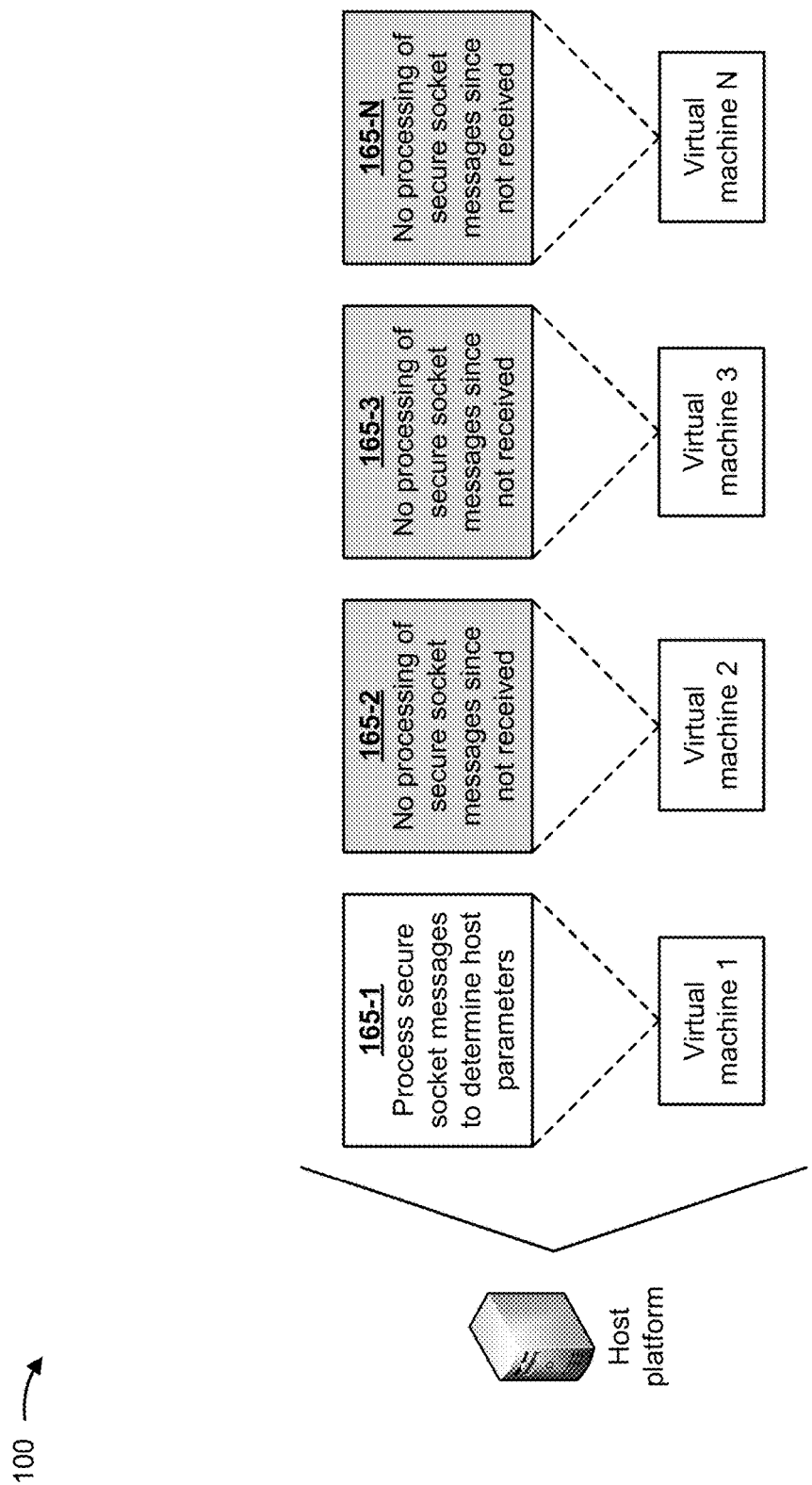

As shown in FIG. 1I, and by reference number 165-1, the first virtual machine (e.g., virtual machine 1) may process the secure socket messages to determine the host parameters. The client application provided in the first virtual machine may enable the first virtual machine to receive the secure socket messages, parse the secure socket messages, and identify the host parameters in the secure socket messages. As further shown in FIG. 1I, and by reference numbers 165-2, 165-3, and 165-N, respectively, the second virtual machine (e.g., virtual machine 2), the third virtual machine (e.g., virtual machine 3), and the Nth virtual machine (e.g., virtual machine N) may not process the secure socket messages, since the second virtual machine, the third virtual machine, and the Nth virtual machine did not receive the secure socket messages.

In some implementations, one or more of the virtual machines may perform an action based on the host parameters. For example, the one or more virtual machines may provide the host parameters to an endpoint device and the endpoint device may display the host parameters to a user of the endpoint device (e.g., so that the user can confirm that a correct host is being utilized, a current software version is being utilized, and/or the like). In another example, the one or more virtual machines may determine whether a software version associated with the computing resource is current, may determine whether a software version associated with the orchestrator is current, may cause current versions of such software to be installed on the computing resource, and/or the like. In some implementations, one or more of the virtual machines may perform an action based on the host parameters, and another one of the virtual machines may not perform an action based on the host parameters.

As indicated above, FIGS. 1A-1I are provided merely as examples. Other examples may differ from what is described with regard to FIGS. 1A-1I.

Figure 2:
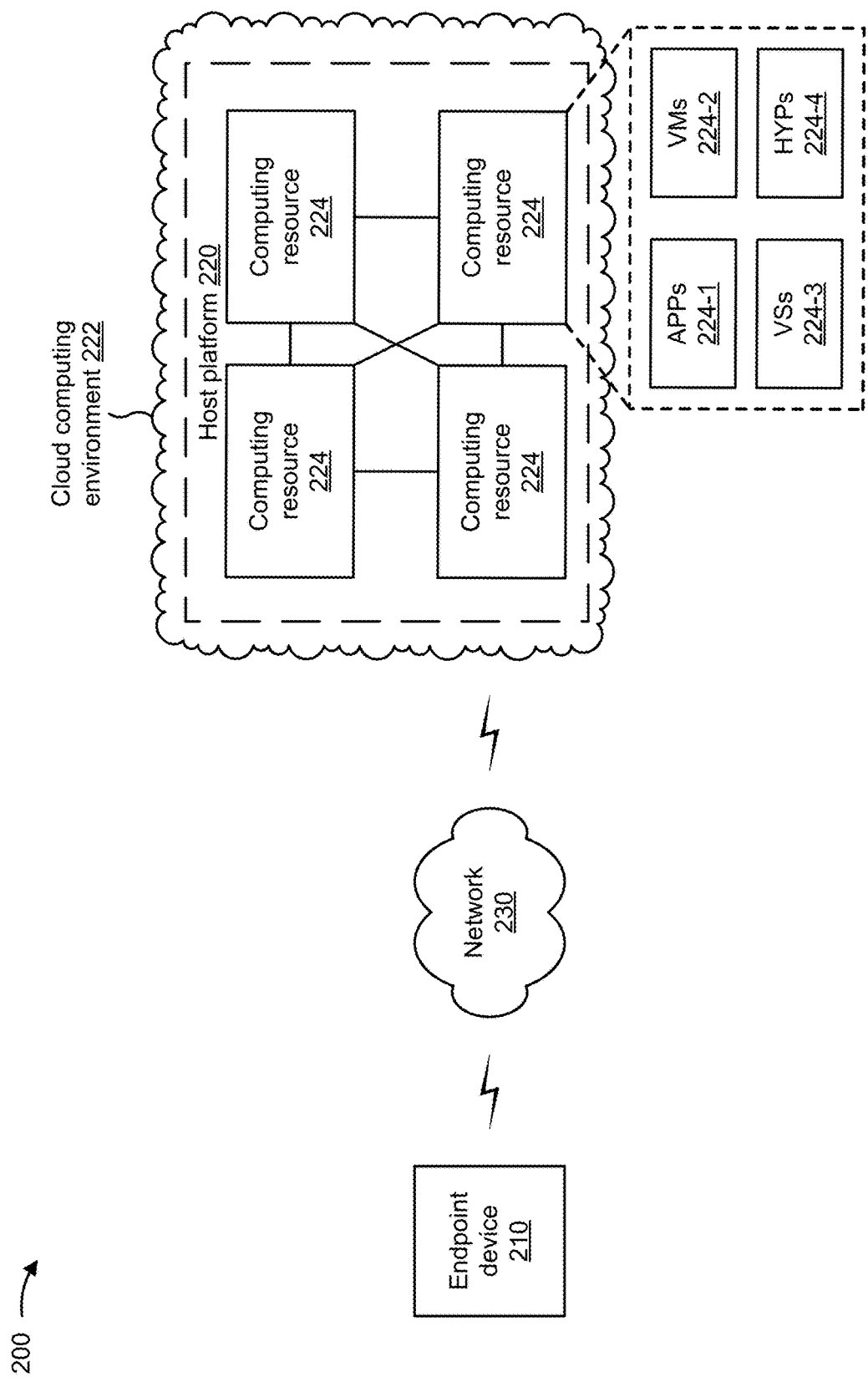
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a host platform 220, and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, endpoint device 210 may receive information from and/or transmit information to host platform 220, via network 230. In some implementations, endpoint device 210 may receive network traffic from and/or may provide network traffic to other endpoint devices 210 via network 230.

Host platform 220 includes one or more devices that provide physical host state information to virtual machines deployed on the physical host. In some implementations, host platform 220 may be designed to be modular such that certain software components may be swapped in or out depending on a particular need. As such, host platform 220 may be easily and/or quickly reconfigured for different uses. In some implementations, host platform 220 may receive information from and/or transmit information to one or more endpoint devices 210.

In some implementations, as shown, host platform 220 may be hosted in a cloud computing environment 222. Notably, while implementations described herein describe host platform 220 as being hosted in cloud computing environment 222, in some implementations, host platform 220 may not be cloud-based (i.e., may be implemented outside of a cloud computing environment) or may be partially cloud-based.

Cloud computing environment 222 includes an environment that hosts host platform 220. Cloud computing environment 222 may provide computation, software, data access, storage, etc., services that do not require end-user knowledge of a physical location and configuration of system(s) and/or device(s) that hosts host platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by endpoint device 210. Application 224-1 may eliminate a need to install and execute the software applications on endpoint device 210. For example, application 224-1 may include software associated with host platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of endpoint device 210 or an operator of host platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
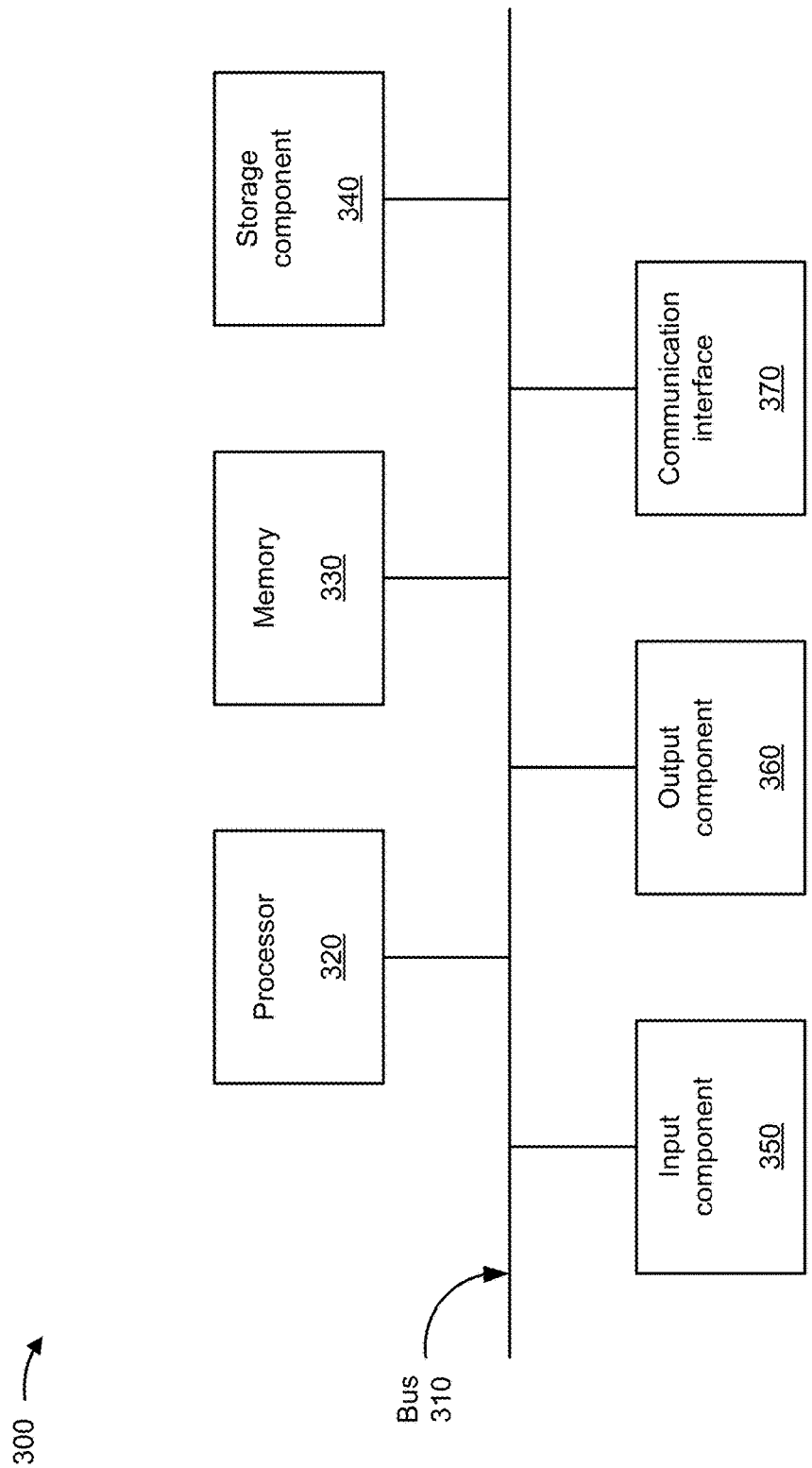
FIG. 3 is a diagram of example components of one or more devices of FIG. 2.

FIG. 3 is a diagram of example components of a device 300. Device 300 may correspond to endpoint device 210, host platform 220, and/or computing resource 224. In some implementations, endpoint device 210, host platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
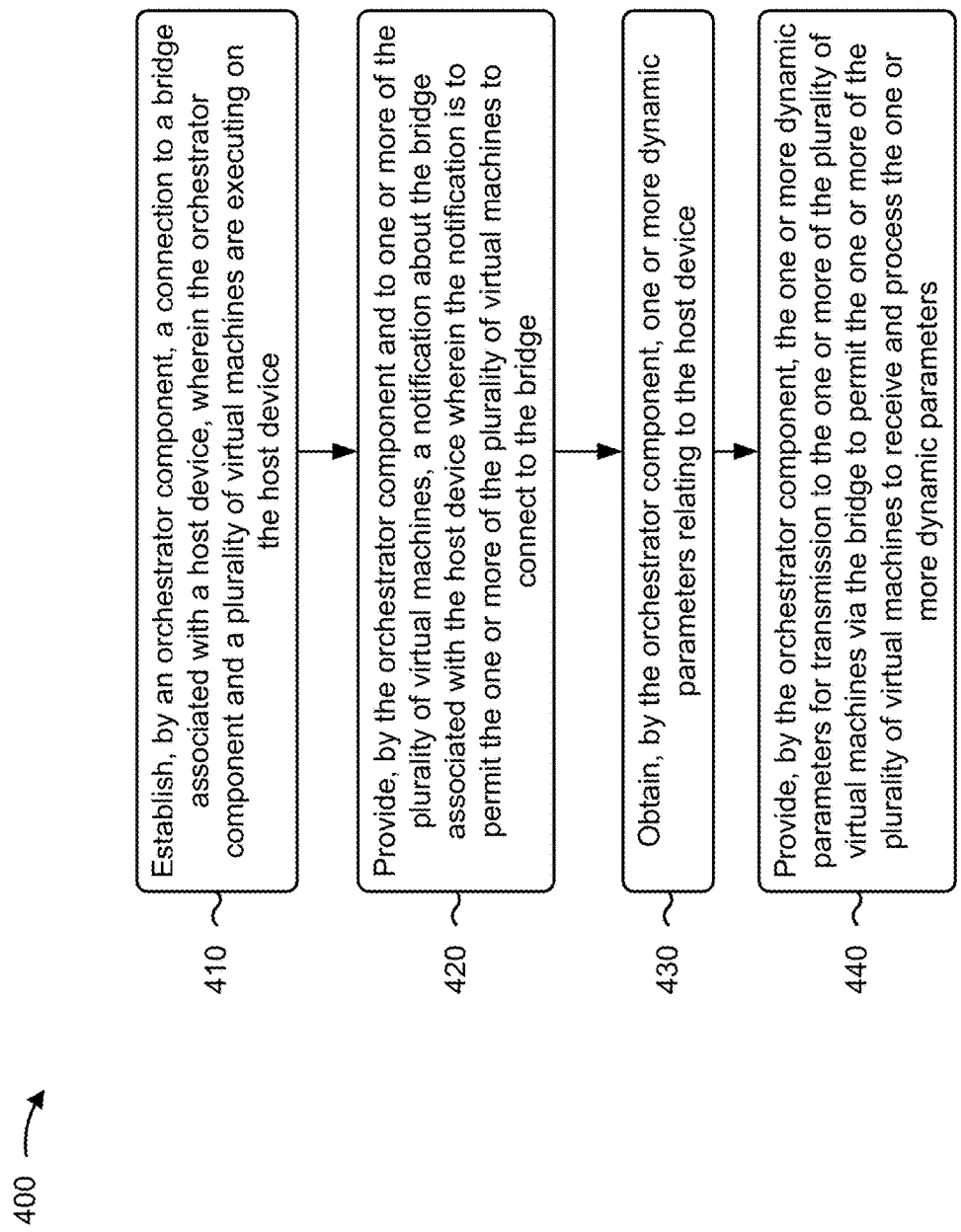
FIGS. 4-6 are flow charts of example processes for providing physical host state information to virtual machines deployed on the physical host.

FIG. 4 is a flow chart of an example process 400 for providing physical host state information to virtual machines deployed on the physical host. In some implementations, one or more process blocks of FIG. 4 may be performed by a host platform (e.g., host platform 220). In some implementations, one or more process blocks of FIG. 4 may be performed by another device or a group of devices separate from or including the host platform, such as an endpoint device (e.g., endpoint device 210).

As shown in FIG. 4, process 400 may include establishing, by an orchestrator component, a connection to a bridge associated with a host device, wherein the orchestrator component and a plurality of virtual machines are executing on the host device (block 410). For example, the host platform (e.g., using computing resource 224, processor 320, memory 330, communication interface 370, and/or the like) may establish, by an orchestrator component, a connection to a bridge associated with the host platform, as described above. In some implementations, the orchestrator component and a plurality of virtual machines may be executing on the host platform.

As further shown in FIG. 4, process 400 may include providing, by the orchestrator component and to one or more of the plurality of virtual machines, a notification about the bridge associated with the host device, wherein the notification is to permit the one or more of the plurality of virtual machines to connect to the bridge (block 420). For example, the host platform (e.g., using computing resource 224, processor 320, communication interface 370, and/or the like) may provide, by the orchestrator component and to one or more of the plurality of virtual machines, a notification about the bridge associated with the host platform, as described above. In some implementations, the notification may be to permit the one or more of the plurality of virtual machines to connect to the bridge.

As further shown in FIG. 4, process 400 may include obtaining one or more dynamic parameters relating to the host device (block 430). For example, the host platform (e.g., using computing resource 224, processor 320, storage component 340, communication interface 370, and/or the like) may obtain one or more dynamic parameters relating to the host platform, as described above.

As further shown in FIG. 4, process 400 may include providing the one or more dynamic parameters for transmission to the one or more of the plurality of virtual machines via the bridge to permit the one or more of the plurality of virtual machines to receive and process the one or more dynamic parameters (block 440). For example, the host platform (e.g., using computing resource 224, processor 320, memory 330, storage component 340, communication interface 370, and/or the like) may provide the one or more dynamic parameters for transmission to the one or more of the plurality of virtual machines via the bridge to permit the one or more of the plurality of virtual machines to receive and process the one or more dynamic parameters, as described above.

Process 400 may include additional implementations, such as any single implementation or any combination of implementations described below and/or in connection with one or more other processes described elsewhere herein.

In a first implementation, providing the one or more dynamic parameters for transmission to the one or more of the plurality of virtual machines may permit the one or more of the plurality of virtual machines to provide the one or more dynamic parameters to one or more endpoint devices associated with the one or more of the plurality of virtual machines.

In a second implementation, alone or in combination with the first implementation, the one or more dynamic parameters may include one or more of a hostname of the host device, a software version associated with the host device, or a software version associated with the orchestrator component.

In a third implementation, alone or in combination with one or more of the first and second implementations, the host platform may create a secure socket connection, with a particular virtual machine of the plurality of virtual machines, via the bridge, and may provide one or more additional dynamic parameters for transmission to the particular virtual machine via the secure socket connection to permit the particular virtual machine to process the one or more additional dynamic parameters.

In a fourth implementation, alone or in combination with one or more of the first through third implementations, when providing the one or more dynamic parameters, the host platform may create a secure socket connection, with a particular virtual machine of the one or more of the plurality of virtual machines, via the bridge, and may provide the one or more dynamic parameters for transmission to the particular virtual machine via the secure socket connection to permit the particular virtual machine to process the one or more dynamic parameters.

In a fifth implementation, alone or in combination with one or more of the first through fourth implementations, when providing, to the one or more of the plurality of virtual machines, the notification about the bridge, the host platform may provide, to one or more of the plurality of virtual machines, the notification about the bridge via a system management basic input/output system (SMBIOS) string or a tag inserted in a domain extensible markup language (XML).

In a sixth implementation, alone or in combination with one or more of the first through fifth implementations, the one or more dynamic parameters may be provided in an extensible markup language (XML) format or a JavaScript object notation (JSON) format.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
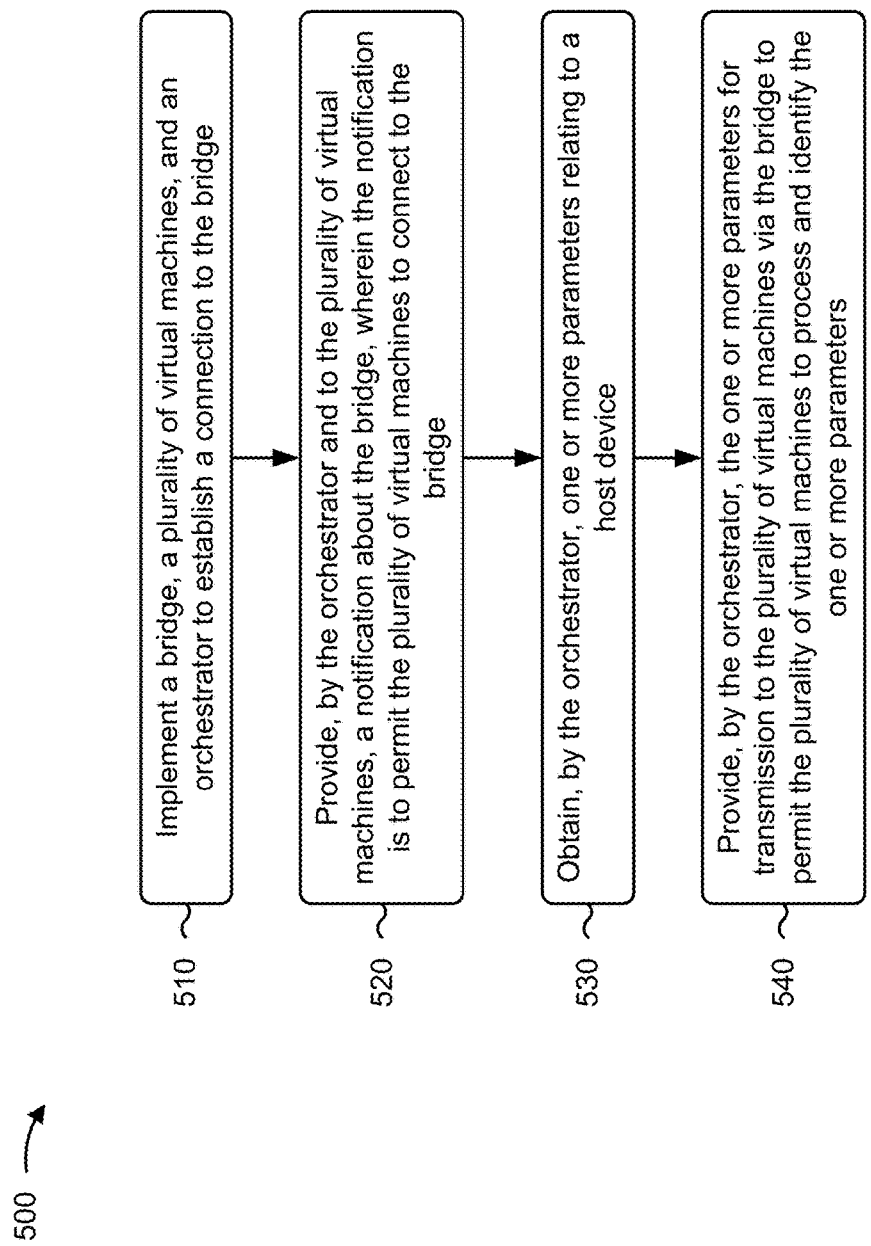

FIG. 5 is a flow chart of an example process 500 for providing physical host state information to virtual machines deployed on the physical host. In some implementations, one or more process blocks of FIG. 5 may be performed by a host platform (e.g., host platform 220). In some implementations, one or more process blocks of FIG. 5 may be performed by another device or a group of devices separate from or including the host platform, such as an endpoint device (e.g., endpoint device 210).

As shown in FIG. 5, process 500 may include implementing a bridge, a plurality of virtual machines, and an orchestrator to establish a connection to the bridge (block 510). For example, the host platform (e.g., using computing resource 224, processor 320, memory 330, communication interface 370, and/or the like) may implement a bridge, a plurality of virtual machines, and an orchestrator to establish a connection to the bridge, as described above.

As further shown in FIG. 5, process 500 may include providing, by the orchestrator and to the plurality of virtual machines, a notification about the bridge, wherein the notification is to permit the plurality of virtual machines to connect to the bridge (block 520). For example, the host platform (e.g., using computing resource 224, processor 320, communication interface 370, and/or the like) may provide, by the orchestrator and to the plurality of virtual machines, a notification about the bridge, as described above. In some implementations, the notification may permit the plurality of virtual machines to connect to the bridge.

As further shown in FIG. 5, process 500 may include obtaining, by the orchestrator, one or more parameters relating to the host device (block 530). For example, the host platform (e.g., using computing resource 224, processor 320, storage component 340, communication interface 370, and/or the like) may obtain, by the orchestrator, one or more parameters relating to the host platform, as described above.

As further shown in FIG. 5, process 500 may include providing, by the orchestrator, the one or more parameters for transmission to the plurality of virtual machines via the bridge to permit the plurality of virtual machines to process and identify the one or more parameters (block 540). For example, the host platform (e.g., using computing resource 224, processor 320, memory 330, storage component 340, communication interface 370, and/or the like) may provide, by the orchestrator, the one or more parameters for transmission to the plurality of virtual machines via the bridge to permit the plurality of virtual machines to process and identify the one or more parameters, as described above.

Process 500 may include additional implementations, such as any single implementation or any combination of implementations described below and/or in connection with one or more other processes described elsewhere herein.

In a first implementation, the one or more parameters may be configured on the host platform.

In a second implementation, alone or in combination with the first implementation, the orchestrator may provide the one or more parameters for transmission to the plurality of virtual machines at predetermined intervals.

In a third implementation, alone or in combination with one or more of the first and second implementations, a particular virtual machine, different than the plurality of virtual machines, may not connect to the bridge and may not receive the one or more parameters, when provided by the orchestrator, based on not connecting to the bridge.

In a fourth implementation, alone or in combination with one or more of the first through third implementations, one of the plurality of virtual machines may perform an action based on the one or more parameters, and another one of the plurality of virtual machines may not perform an action based on the one or more parameters.

In a fifth implementation, alone or in combination with one or more of the first through fourth implementations, the orchestrator may create a secure socket connection, with a particular virtual machine of the plurality of virtual machines, via the bridge, and may provide one or more additional parameters for transmission to the particular virtual machine via the secure socket connection to permit the particular virtual machine to process the one or more additional parameters.

In a sixth implementation, alone or in combination with one or more of the first through fifth implementations, the host platform may provide a client application to one of the plurality of virtual machines, where the client application may enable the one of the plurality of virtual machines to process and identify the one or more parameters.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
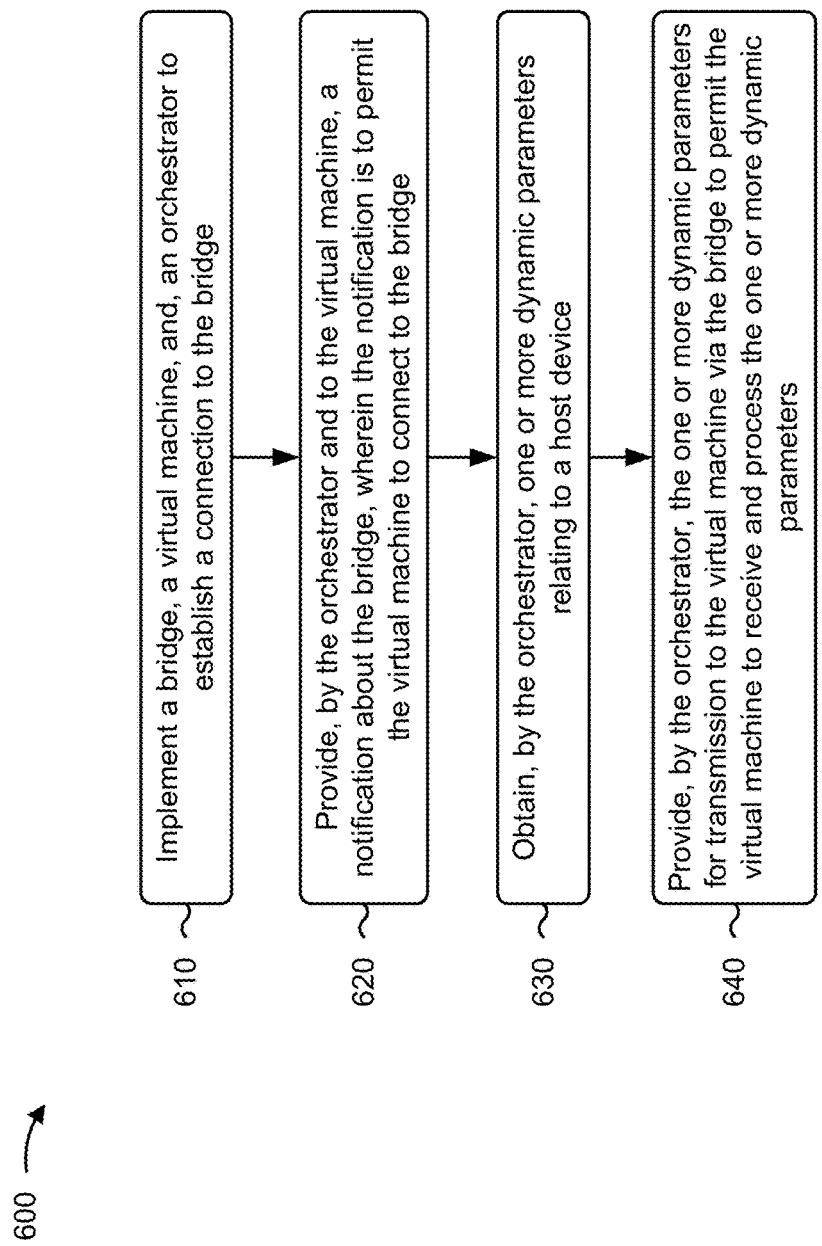

FIG. 6 is a flow chart of an example process 600 for providing physical host state information to virtual machines deployed on the physical host. In some implementations, one or more process blocks of FIG. 6 may be performed by a host platform (e.g., host platform 220). In some implementations, one or more process blocks of FIG. 6 may be performed by another device or a group of devices separate from or including the host platform, such as an endpoint device (e.g., endpoint device 210).

As shown in FIG. 6, process 600 may include implementing a bridge, a virtual machine, and an orchestrator to establish a connection to the bridge (block 610). For example, the host platform (e.g., using computing resource 224, processor 320, memory 330, communication interface 370, and/or the like) may implement a bridge, a virtual machine, and an orchestrator to establish a connection to the bridge, as described above.

As shown in FIG. 6, process 600 may include providing, by the orchestrator and to the virtual machine, a notification about the bridge, wherein the notification is to permit the virtual machine to connect to the bridge (block 620). For example, the host platform (e.g., using computing resource 224, processor 320, storage component 340, communication interface 370, and/or the like) may provide, by the orchestrator and to the virtual machine, a notification about the bridge, as described above. In some implementations, the notification may permit the virtual machine to connect to the bridge.

As shown in FIG. 6, process 600 may include obtaining, by the orchestrator, one or more dynamic parameters relating to the host device (block 630). For example, the host platform (e.g., using computing resource 224, processor 320, memory 330, communication interface 370, and/or the like) may obtain, by the orchestrator, one or more dynamic parameters relating to the host platform, as described above.

As shown in FIG. 6, process 600 may include providing, by the orchestrator, the one or more dynamic parameters for transmission to the virtual machine via the bridge to permit the virtual machine to receive and process the one or more dynamic parameters (block 640). For example, the host platform (e.g., using computing resource 224, processor 320, memory 330, storage component 340, input component 350, output component 360, communication interface 370, and/or the like) may provide, by the orchestrator, the one or more dynamic parameters for transmission to the virtual machine via the bridge to permit the virtual machine to receive and process the one or more dynamic parameters, as described above.

Process 600 may include additional implementations, such as any single implementation or any combination of implementations described below and/or in connection with one or more other processes described elsewhere herein.

In a first implementation, the host platform may cause the virtual machine to provide the one or more dynamic parameters to an endpoint device associated with the virtual machine.

In a second implementation, alone or in combination with the first implementation, the one or more dynamic parameters may include information, associated with the host device, that periodically changes.

In a third implementation, alone or in combination with one or more of the first and second implementations, the host platform may create, by the orchestrator and via the bridge, a secure socket connection with the virtual machine, and may provide, by the orchestrator, one or more additional dynamic parameters for transmission to the virtual machine via the secure socket connection.

In a fourth implementation, alone or in combination with one or more of the first through third implementations, the one or more dynamic parameters may be provided for transmission to the virtual machine at predetermined intervals.

In a fifth implementation, alone or in combination with one or more of the first through fourth implementations, the virtual machine may perform an action based on the one or more dynamic parameters.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   establishing, by an orchestrator component, a connection to a bridge associated with a host device,
      wherein the orchestrator component and a plurality of virtual machines are executing on the host device;
   providing, by the orchestrator component and to one or more of the plurality of virtual machines, a notification about the bridge associated with the host device,
      wherein the notification is to permit the one or more of the plurality of virtual machines to connect to the bridge in order to receive information,
         wherein at least one of the one or more of the plurality of virtual machines, indicates an interest in receiving the information to be provided by the bridge as identified in the notification;
   obtaining, by the orchestrator component, one or more dynamic parameters, included in the information, relating to the host device; and
   providing, by the orchestrator component, the one or more dynamic parameters for transmission to the at least one of the one or more of the plurality of virtual machines via the bridge to permit the at least one of the one or more of the plurality of virtual machines to receive and process the one or more dynamic parameters.

2. The method of claim 1, wherein providing the one or more dynamic parameters for transmission to the at least one of the one or more of the plurality of virtual machines permits the at least one of the one or more of the plurality of virtual machines to provide the one or more dynamic parameters to one or more endpoint devices associated with the at least one of the one or more of the plurality of virtual machines.

3. The method of claim 1, wherein the one or more dynamic parameters include one or more of:
   a hostname of the host device,
   a software version associated with the host device, or
   a software version associated with the orchestrator component.

4. The method of claim 1, further comprising:
   creating a secure socket connection, with a particular virtual machine of the plurality of virtual machines, via the bridge; and
   providing one or more additional dynamic parameters for transmission to the particular virtual machine via the secure socket connection to permit the particular virtual machine to process the one or more additional dynamic parameters.

5. The method of claim 1, wherein providing the one or more dynamic parameters comprises:
   creating a secure socket connection, with a particular virtual machine of the one or more connected virtual machines, via the bridge; and
   providing the one or more dynamic parameters for transmission to the particular virtual machine via the secure socket connection to permit the particular virtual machine to process the one or more dynamic parameters.

6. The method of claim 1, wherein providing the one or more dynamic parameters comprises:
   creating a secure socket connection, with a particular virtual machine of the at least one of the one or more of the plurality of virtual machines, via the bridge; and
   providing the one or more dynamic parameters for transmission to the particular virtual machine via the secure socket connection to permit the particular virtual machine to process the one or more dynamic parameters.

7. The method of claim 1, wherein the one or more dynamic parameters are provided in an extensible markup language (XML) format or a JavaScript object notation (JSON) format.

8. A host device, comprising:
   one or more memories; and
   one or more processors, communicatively coupled to the one or more memories, the one or more memories and the one or more processors to implement:
      a bridge;
      a plurality of virtual machines; and
      an orchestrator to:
         establish a connection to the bridge;
         provide, to the plurality of virtual machines, a notification about the bridge,
            wherein the notification is to permit the plurality of virtual machines to connect to the bridge in order to receive information,
               wherein at least one of the plurality of virtual machines, indicate an interest in receiving the information to be provided by the bridge as identified in the notification;
         obtain one or more parameters, included in the information, relating to the host device; and
         provide the one or more parameters for transmission to the at least one of the one or more of the plurality of virtual machines via the bridge to permit the at least one of the one or more of the plurality of virtual machines to process and identify the one or more parameters.

9. The host device of claim 8, wherein the one or more parameters are configured on the host device.

10. The host device of claim 8, wherein the orchestrator is to provide the one or more parameters for transmission to the at least one of the one or more of the plurality of virtual machines at predetermined intervals.

11. The host device of claim 8, wherein a particular virtual machine, different than the at least one of the one or more of the plurality of virtual machines, does not connect to the bridge and does not receive the one or more parameters, when provided by the orchestrator, based on not connecting to the bridge.

12. The host device of claim 8, wherein one of the at least one of the one or more of the plurality of virtual machines performs an action based on the one or more parameters, and another one of the at least one of the one or more of the plurality of virtual machines does not perform an action based on the one or more parameters.

13. The host device of claim 8, wherein the orchestrator is further to:
    create a secure socket connection, with a particular virtual machine of the at least one of the one or more of the plurality of virtual machines, via the bridge; and
    provide one or more additional parameters for transmission to the particular virtual machine via the secure socket connection to permit the particular virtual machine to process the one or more additional parameters.

14. The host device of claim 8, wherein the one or more processors are further to:
    provide a client application to one of the at least one of the one or more of the plurality of virtual machines,
        wherein the client application enables the one of the plurality of virtual machines to process and identify the one or more parameters.

15. A non-transitory computer-readable medium storing instructions, the instructions comprising:
    one or more instructions that, when executed by one or more processors of a host device, cause the one or more processors to implement:
    a bridge;
    a virtual machine; and
    an orchestrator to:
        establish a connection to the bridge;
        provide, to the virtual machine, a notification about the bridge,
            wherein the notification is to permit the virtual machine to connect to the bridge in order to receive information,
            wherein the virtual machine indicates an interest in receiving the information to be provided by the bridge as identified in the notification;
        obtain one or more dynamic parameters, included in the information, relating to the host device; and
        provide, based on the virtual machine indicating the interest, the one or more dynamic parameters for transmission to the virtual machine via the bridge to permit the virtual machine to receive and process the one or more dynamic parameters.

16. The non-transitory computer-readable medium of claim 15, wherein the instructions further comprise:
    one or more instructions that, when executed by the one or more processors, cause the one or more processors to:
        cause the virtual machine to provide the one or more dynamic parameters to an endpoint device associated with the virtual machine.

17. The non-transitory computer-readable medium of claim 15, wherein the one or more dynamic parameters include information, associated with the host device, that periodically changes.

18. The non-transitory computer-readable medium of claim 15, wherein the instructions further comprise:
    one or more instructions that, when executed by the one or more processors, cause the one or more processors to:
        create, by the orchestrator and via the bridge, a secure socket connection with the virtual machine; and
        provide, by the orchestrator, one or more additional dynamic parameters for transmission to the virtual machine via the secure socket connection.

19. The non-transitory computer-readable medium of claim 15, wherein the one or more dynamic parameters are provided for transmission to the virtual machine at predetermined intervals.

20. The non-transitory computer-readable medium of claim 15, wherein:
    the virtual machine performs an action based on the one or more dynamic parameters.

* * * * *

UNITED STATES PATENT AND TRADEMARK OFFICE
CERTIFICATE OF CORRECTION

PATENT NO. : 11,163,600 B2  
APPLICATION NO. : 16/554054  
DATED : November 2, 2021  
INVENTOR(S) : Abhinav Tandon et al.

Page 1 of 1

It is certified that error appears in the above-identified patent and that said Letters Patent is hereby corrected as shown below:

In the Claims

Column 16, Lines 13-14, change "virtual machine of the one or more connected virtual machines, via the bridge; and" to -- virtual machine of the at least one of the one or more of the plurality of virtual machines, via the bridge; and --

Column 16, Lines 19-28, change "6. The method of claim 1, wherein providing the one or more dynamic parameters comprises: creating a secure socket connection, with a particular virtual machine of the at least one of the one or more of the plurality of virtual machines, via the bridge; and providing the one or more dynamic parameters for transmission to the particular virtual machine via the secure socket connection to permit the particular virtual machine to process the one or more dynamic parameters." to -- 6. The method of claim 1, wherein providing, to the at least one of the one or more of the plurality of virtual machines, the notification about the bridge comprises: providing, to one or more of the plurality of virtual machines, the notification about the bridge via a system management basic input/output system (SMBIOS) string or a tag inserted in a domain extensible markup language (XML). --

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*